US009501050B2

(12) United States Patent
Pan et al.

(10) Patent No.: US 9,501,050 B2
(45) Date of Patent: Nov. 22, 2016

(54) DC THERMOSTAT WITH LOW BATTERY RESPONSE

(71) Applicants: Weidong Pan, Morganville, NJ (US); Michael P Muench, Canastota, NY (US); Andrew S Kadah, Manlius, NY (US); Eric Christopher Wood, East Syracuse, NY (US)

(72) Inventors: Weidong Pan, Morganville, NJ (US); Michael P Muench, Canastota, NY (US); Andrew S Kadah, Manlius, NY (US); Eric Christopher Wood, East Syracuse, NY (US)

(73) Assignee: International Controls and Measurements Corp., North Syracuse, NY (US)

( * ) Notice: Subject to any disclaimer, the term of this patent is extended or adjusted under 35 U.S.C. 154(b) by 377 days.

(21) Appl. No.: 14/307,628

(22) Filed: Jun. 18, 2014

(65) Prior Publication Data

US 2015/0370269 A1 Dec. 24, 2015

(51) Int. Cl.
  *G01N 27/416* (2006.01)
  *G05B 15/02* (2006.01)
  *G05F 1/46* (2006.01)
  *G05D 23/19* (2006.01)

(52) U.S. Cl.
  CPC ............ *G05B 15/02* (2013.01); *G05D 23/1904* (2013.01); *G05F 1/463* (2013.01)

(58) Field of Classification Search
  CPC ............ G01R 31/3658; G01R 31/3627; G01R 31/3662; G01R 31/3631; Y02E 60/12
  USPC .......................................................... 324/426
  See application file for complete search history.

(56) References Cited

U.S. PATENT DOCUMENTS

| 4,333,093 | A | 6/1982 | Raber et al. | |
|---|---|---|---|---|
| 5,467,005 | A * | 11/1995 | Matsumoto | H02J 7/0081 320/148 |
| 7,059,769 | B1 * | 6/2006 | Potega | B60L 11/1861 338/22 R |
| 7,792,554 | B2 | 9/2010 | Abdel-Kader | |
| 8,306,669 | B1 * | 11/2012 | Smith | F24H 9/2071 700/153 |
| 2008/0311478 | A1 * | 12/2008 | Onuki | H01M 10/052 429/231.95 |
| 2012/0233478 | A1 | 9/2012 | Mucignat et al. | |

* cited by examiner

*Primary Examiner* — Arun Williams
(74) *Attorney, Agent, or Firm* — Bernhard P. Molldrem, Jr.

(57) ABSTRACT

A battery powered thermostat senses a battery voltage drop to a low-battery voltage level. At that point, the thermostat microprocessor provides a LOW BATTERY alert message, visible on the thermostat display. If the occupant fails to replace the power cells or does not notice the LOW BATTERY message, when the battery voltage drops further the microprocessor alters the thermostat set points. This reduces the number of heating or cooling cycles per day, and reduces the number of actuations of the latching relays in the thermostat, conserving remaining battery life. At a further drop in battery voltage the set points are changed additionally. Additional functions, such as second level heat, second level cooling, and fan speed, are disabled. The change in heat or cooling cycles induces the occupant to check the thermostat where he or she will notice the LOW BATTERY message.

9 Claims, 3 Drawing Sheets

DC THERMOSTAT WITH LOW BATTERY RESPONSE

BACKGROUND OF THE INVENTION

The present invention relates to residential heating and/or cooling systems and other indoor comfort systems, and is more particularly concerned with battery-powered thermostats of the type that derive the power for monitoring conditions within the comfort space and for controlling the signaling to the furnace or other comfort system from a battery i.e, dry cells or alkaline cells. The invention is more specifically directed to DC thermostats with a battery level monitoring function, and with a display that includes a low-battery alert message when the energy remaining in the battery is low and the battery should be replaced. Heat may be provided from a gas, oil, or electric furnace or heat pump, and cooling may be provided from a compression/condensation/expansion/evaporation cycle air conditioner, an absorption type air conditioner, a ground-water heat exchange cooing system, or other available chilling apparatus. As used here, the term "cooling" includes both sensible cooling (reducing the temperature of the comfort air) and latent cooling (removing humidity). These comfort air apparatus may have additional functions for better control of the environmental air in the comfort space, such as multiple fan speeds, high and low heating, and high and low compressor speeds.

Wall thermostats are typically installed on an interior wall of a dwelling, business space or other residential or commercial space to control the operation of a furnace, air conditioner, heat pump, or other environmental control equipment. The thermostat continuously monitors the temperature of the room or other interior comfort space or zone, and is connected by a run of thermostat wires to the associated environmental control equipment to signal a call for heating, a call for cooling, or otherwise to keep an interior comfort space parameter, such as temperature, within some range (e.g., 68° F., ±1.0° F.). Other controls may be available, sensitive to other parameters, such as humidity or particulate level.

In many applications, i.e., in many permanent homes, and in mobile, recreational, or marine dwellings and spaces, battery-powered thermostats are frequently the preferred thermostat. These typically have a battery power source, e.g., a pair of AA alkaline power cells, installed within the thermostat housing to power the electronics. These supply DC energy to the internal electronics within the thermostat and power latching relays (or in some cases, a solid-state switch, such as a high-side switch, triac switch, or digital signal) that connect thermostat power (such as 24 volts AC) to the particular thermostat wires that control heating, fan, air conditioning, and so forth. As used in this description and in the accompanying claims, the term "latching relay" should be read to include both electro-magnetic latching relays and also equivalent solid state switching devices such as the afore-mentioned high-side switch or triac switch, etc. The thermostat is constantly monitoring the temperature in the comfort space and is also constantly monitoring the voltage level available on the DC battery power source. One or more controls, i.e., push buttons, rotary knob(s) etc., allow the occupant to set and adjust temperature setpoints for heating and/or for air conditioning. An LCD display screen on the housing of the thermostat allows the occupant to see the room temperature and also to see other functions, such as temperature setpoints during a temperature setting sequence. A low-battery message can be displayed on this screen if the battery voltage drops below a level that indicates the battery is approaching the end of its useful life and should be replaced.

It is frequently the case that the occupant has no reason to check the thermostat or look at it. If this is the case when the battery voltage drops, it may be that the low-battery message will appear on the thermostat display screen and the occupant will not notice it for a period of several weeks. However, normal heating and/or cooling operations mean that the thermostat will continue to draw power from the power cells, especially when the thermostat pulses the latching relay when there is a call for heat or cooling and again when the thermostat is satisfied. The remaining battery energy continues to be consumed and the battery voltage will drop; eventually the thermostat will stop operating if the batteries are not replaced with fresh ones. It also may be the case that a low-battery condition will occur when the occupant is away for an extended period, and that the energy cells may reach the end of their life before the occupant returns. If the furnace or other HVAC apparatus fails to cycle properly during winter conditions, this may result in frozen water pipes or other damage.

Because of the foregoing problems, it would be desirable to provide a feature or features for battery powered thermostats that will prolong the battery life when a low-voltage condition occurs, and if possible change the heating and/or cooling conditions in the comfort space in a way that will gently induce the occupant to check the thermostat (and thus be alerted to the low-battery message displayed there).

OBJECTS AND SUMMARY OF THE INVENTION

Accordingly, it is an object of the present invention to provide an improvement to a battery powered, i.e., DC thermostat that overcomes the above-mentioned drawback(s) of the prior art.

It is another object to provide an effective means for the thermostat to automatically adjust its temperature setpoints in a way that extends the period between furnace cycles or air-conditioning cycles, and prolongs the remaining battery life during a low-battery condition.

It is yet another object to provide the thermostat with a mechanism to gently alert the occupant of the comfort space, by change of the heating or cooling cycles, to check the thermostat when a low-battery alert is being displayed thereon.

In accordance with one aspect of the present invention, a thermostat is adapted to be mounted on a wall of a comfort zone within a dwelling or other space or structure, and is adapted to communicate with a comfort air control unit (furnace or air conditioner, for example) that provides heated and/or conditioned air to the comfort zone. The thermostat continuously monitors the temperature of air within the comfort zone. The wall thermostat has a housing, electronic control circuitry within the housing and powered by a DC power source, e.g., a pair of AA power cells, together providing battery power at a battery voltage $V_b$ which may be a nominal 3 volts.

A temperature sensing element in, or on, the housing monitors the room air or comfort zone temperature. A remote temperature sensor may be used in some cases.

A selector mechanism, favorably a set of selector push buttons, is or are configured to permit the occupant to adjust the temperature setpoint of the thermostat.

An LCD display or equivalent display panel on the housing is configured so as to show the temperature within the comfort zone and the temperature setpoint(s) for heating and/or cooling, and includes a feature for providing a low battery alert message. This latter may be a display of the words "LOW BATT" presented on a portion of the screen, and may flash on and off. Alternatively, the low-battery alert display may be a flashing LED on the housing near the LCD screen.

A microprocessor within the thermostat housing is configured or adapted to control actuation of the comfort air apparatus when the comfort space temperature drops to (or rises to) the temperature setpoint and to control deactuation of comfort air apparatus when the comfort air temperature changes from the setpoint by a predetermined swing amount (e.g., ±½ degree to ±3 degrees). The microprocessor has power terminals connected with the DC power source; one or more input terminals connected with the temperature sensing element; one or more display output terminals connected with said display; and at least a first pair of relay output terminals.

To apply the thermostat power to the wires of the thermostat wire run, the thermostat has at least one latching relay having ON and OFF inputs connected respectively to respective ON and OFF outputs terminals of the at least one pair of output terminals of the microprocessor. Each such latching relay (or solid state switch, such as a high-side switch or triac switch) has an electromechanical or electronic contact mechanism to connect thermostat power to one wire of the thermostat wires in response to a pulse from one output terminal of said pair of output terminals and to disconnect thermostat power from that one wire in response to a pulse from the other output terminal of the at least one pair of output terminals.

In this embodiment these latching relays are electromechanical relays using relay coils to pull a moving contact. However, the invention is not limited only to these relays, and low-battery action of the type described here can be employed with many devices, e.g., solid state relays such as SCRs and TRIACs. Also, the battery-saving action discussed here can be used in many types of devices besides thermostats, where some of the device's functions can be temporarily disabled to conserve remaining battery life.

As discussed earlier, the thermostat microprocessor has a battery voltage monitoring functionality to compare the battery voltage $V_b$ of the DC power source with one or more predetermined low-voltage threshold levels and to actuate the low-battery alert message on the display panel when the battery voltage $V_b$ drops from its nominal 3 volts to or below the low-voltage threshold, e.g., 2.4 volts, or further below that to another low-voltage threshold, e.g., 2.2 volts.

Besides this, the microprocessor further includes a temperature setpoint altering functionality operative when the battery voltage $V_b$ drops to or below one of these one or more voltage thresholds to change one of the setpoint selected earlier by the occupant (e.g., raising the heating setpoint from 68° to 69°) or the swing amount, e.g. (increasing the swing from ½° to 2°) thereby increasing the cycle time between actuation and deactuation of the comfort air apparatus. This reduces the frequency of pulsing of the latching relays, thus reducing the amount of battery energy draw and thereby prolonging the remaining service life of the DC power source.

When the occupant is present, the lower heating setpoint (or higher cooling setpoint) temperatures will be usually noticeable to him or her, which should induce the occupant to check the thermostat. When he or she does that, the occupant will notice the "LOW BATT" alert message being displayed, and that will prompt him or her to replace the depleted AA cells with fresh ones. Also, because there is less frequent current draw on the batteries during a low-battery condition, the battery life is extended, and the furnace (or air conditioning) continues to operate, but perhaps at a lowered temperature in the case of heating) to reduce the risk of frozen water pipes or other damage that may result from thermostat failure. This reduces the risk of thermal runaway from the battery lacking energy to switch the latching relay off.

Where the battery voltage $V_b$ has an initial nominal voltage of 3.0 volts, the low-voltage threshold at which the microprocessor actuates the low battery alert message can be about a half-volt below the nominal voltage, e.g., at 2.4 volts, and there can be another low-voltage threshold, e.g., 2.2 volts at which the microprocessor alters the heating initiation setpoint (e.g., from 69° to 68° or down to 67°) or swing amount (e.g., from ½° to 2°). At a further low-voltage threshold, e.g., 2.1 volts, the microprocessor can change the setpoint by another degree (e.g., down from 67 ° to 66°) or change the swing amount (from 2° to 3°), or preferably both. As a practical matter, the thermostat setpoint settings and the temperature swings work together, at least on most modern thermostats. For example, if the thermostat is set to "72° " for heat, the heat initiation setpoint may be 71°, but with the satisfaction setpoint temperature at 73°. When there is low battery condition, the algorithm on the microprocessor would typically lower the initiation setpoint, e.g., from 71° to 68°, while leaving the satisfaction temperature the same at 73°. This would mean an increase in the swing from 2° to 5°. Reducing the initiation setpoint to 68° but leaving the swing amount at 2° would mean lowering the satisfaction temperature to 70°. This will not reduce the frequency of heating cycles as well as lowering only the initiation setpoint, as discussed just above. However, it may induce the occupant to check the thermostat, and become aware of the need to replace the batteries. The preferred approach is for the setpoint and swing amount to go hand in hand.

As an alternative, it is possible to keep the initiation setpoint the same, but to change the swing amount. This means (based on the example just given) keeping the initiation setpoint at 71°, but raising the satisfaction temperature from 73° to 76°. From the customer or occupant's standpoint, manipulation of the initiation setpoint would be more acceptable than manipulation of the satisfaction setpoint, which increases the room temperature and wastes energy.

Additional latching relays or equivalent solid-state switches in the thermostat are associated with the thermostat wires for fan speed, high-low heat, high-low compressor, etc. Each of these is normally switched from ON to OFF or from OFF to ON in response to a pulse from an output terminal of an additional pair of output terminals of the microprocessor. In the embodiments of this invention, the aforementioned temperature setpoint altering functionality of the microprocessor is operative, when the battery voltage $V_b$ drops to or below the low-voltage threshold, to disable pulsing from output terminals of the microprocessor to these additional latching relays or equivalent solid-state switches, thus further minimizing battery drain on the DC power supply during a low-voltage condition.

An abnormal heating or cooling event can be detected by the microprocessor based on a time rate of change of temperature (dT/dt), and/or excessively high or low temperature of air in the comfort space. These conditions may result from an inability of the associated latching relay to switch OFF owing to insufficient electrical energy in the power cells of the DC power supply. The thermostat microprocessor can accommodate this, to at least a limited degree, by increasing the pulse width of the signal sent to the relay, from a typical 20 milliseconds to somewhat lengthened 25 milliseconds. This feature does increase the battery drain somewhat, and during a prolonged low battery condition the microprocessor algorithm may turn this feature off.

The above and other objects, features, and advantages of this invention will be better understood from the ensuing description of a preferred embodiment, which is to be read in connection with the accompanying Drawing.

DETAILED DESCRIPTION OF THE PREFERRED EMBODIMENT

Figure 1:
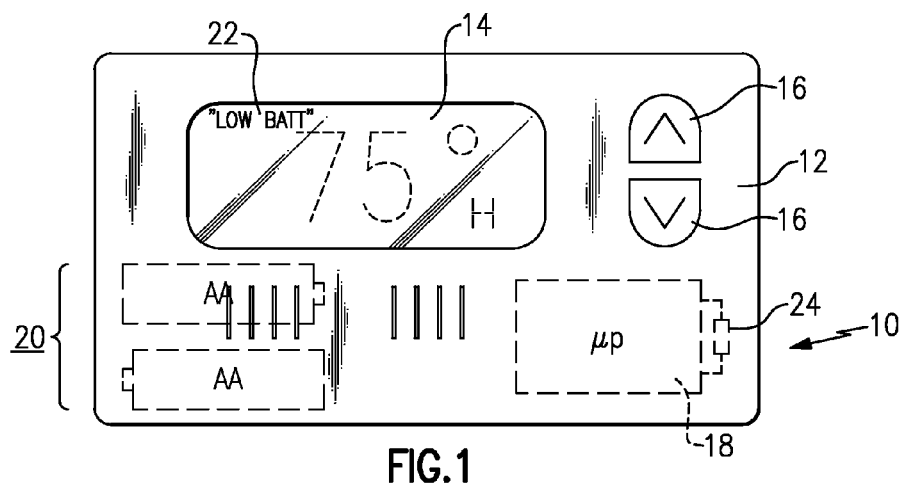
FIG. 1 is a front view of a DC thermostat of one possible embodiment of this invention.

With reference now to the Drawing, FIG. 1 shows a battery-powered thermostat 10 which, as shown here, has a housing or case 12 with an LCD display 14 for showing temperature, temperature set-points, and thermostat settings. There are also manual controls, here in the form of up-down push buttons 16, 16, for adjusting temperature setpoints, for example. In some versions there can be more than the two push buttons, or the controls can be virtual, i.e, where the display 14 is in the form of a touch screen. In this version, both control buttons 16 are depressed simultaneously to enter a control mode, and later to exit back to run mode. In this thermostat 10, a microprocessor 18 stores thermostat settings, including for example set-point for heating and a set-point for air conditioning. These may be entered by the technician or installer at the time the thermostat is installed, and later can be changed by the owner or other occupant. DC battery power is supplied from a battery 20, here shown schematically as being comprised of a pair of AA size power cells. In some thermostats, three or more cells may be required, or a different size cell, e.g., AAA, may be employed. The microprocessor 18 continuously monitors the battery voltage $V_b$. In this embodiment, the initial battery voltage is a nominal 3.0 volts, but the battery voltage $V_b$ decreases gradually over the life of the power cells. When the battery voltage $V_b$ drops to a predetermined low-battery threshold, e.g., 2.4 volts, the microprocessor may actuate a LOW BATT indication 22 to provide a visual alert message to the occupant when the battery voltages drops to or below that threshold. FIG. 1 also shows a solid-state temperature sensor 24 coupled with the microprocessor, so that the microprocessor 18 can continuously monitor the temperature in the comfort space in which the thermostat is mounted.

Figure 2:
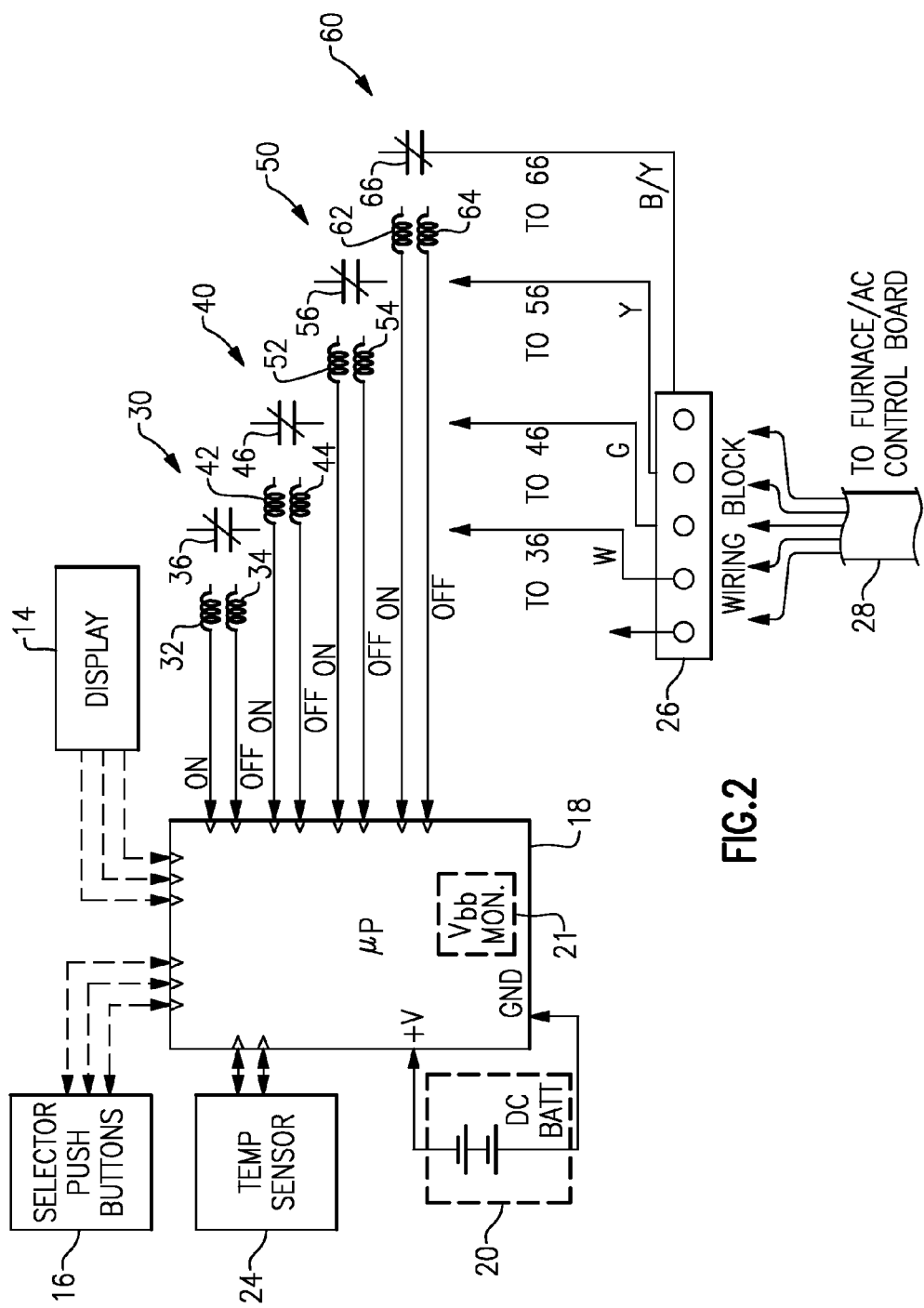
FIG. 2 is a schematic view of the DC thermostat of this embodiment.

Some details of the thermostat 10 are illustrated schematically in FIG. 2. Here, the microprocessor 18, which is favorably an integrated circuit with multiple output and input terminals, has power ports +V and Gnd connected to positive and negative terminals of the DC voltage source 20, and the microprocessor 18 is configured to have a battery voltage monitoring functionality 21 therein, for continuously monitoring the battery voltage $V_b$, and the microprocessor executes a battery-life prolonging action if the battery voltage drops below a low-battery threshold or takes some additional action if the battery voltage $V_b$ drops below a second low-battery threshold. The thermostat select buttons are coupled to input terminals of the microprocessor, and the display module 14 is coupled to output terminals of the microprocessor 18. The microprocessor 18 has input terminal ports connected with the temperature sensor 24, and has a number of pairs of output terminal ports connected with respective latching relays 30, 40, 50 and 60 provided for controlling heating, fan operation, air conditioning, and high-low fan speed, respectively. There may be more or fewer latching relays, depending upon the operation of the HVAC comfort air apparatus, which may include a furnace and/or air conditioner, heat pump, and may have second-level heating, second-level air conditioning, or other features.

In this illustrated embodiment, the heating latching relay 30 has a first relay coil 32 that is coupled to an ON output terminal of the microprocessor and a second relay coil 34 that is coupled to an associated OFF output terminal. In other embodiments, solid-state switch devices as mentioned earlier could be employed instead of the latching relays. These relay coils may each include a driver, e.g., a transistor coupled to the coil, which is not shown in this view for the sake of simplicity. When the microprocessor sends a pulse to energize the relay coil 32, the relay coil 32 will pull an associated relay contact 36 to a closed or ON condition, and connect 24 volt AC thermostat power to a heating wire, i.e., a white or W wire connection at the thermostat wiring block 26, This provides a call for heat along the corresponding wire of the thermostat wire bundle 28 to cause the furnace to go through a heating cycle. When the microprocessor, comparing the output of the sensor 24 with the stored temperature setpoint, determines that the thermostat has been satisfied, the microprocessor 18 sends an OFF pulse to the other relay coil 34 which then de-latches the contact 36 and pulls it to its open or OFF position. The temperature at which the thermostat is satisfied may typically be 1 degree to 3 degrees above the heating setpoint. The difference between setpoint and the satisfaction temperature, i.e., temperature swing, may be programmable in the microprocessor. A thermostat wire bundle 28 extends from the thermostat wiring bundle to the furnace/air-conditioning room comfort apparatus (not shown). The microprocessor 18 actuates the other latching relays 40, 50, 60 etc in a similar fashion.

A fan relay 40 is shown here with fan relay coils 42 and 44 coupled to respective ON and OFF output ports of the microprocessor 18 for latching fan relay contact on and off, respectively to provide thermostat power to a fan wire G (green) for fan-only operations. An A/C or compressor relay 50 has its relay coils 52 and 54 coupled to respective output ports of the microprocessor 18 to closing and opening the associated air-conditioning relay contact 56 and connecting thermostat power to the air-conditioning wire Y (yellow), and disconnecting the thermostat power when the room air has cooled down to satisfy the thermostat. An additional relay 60, here a fan-speed relay, has relay coils 62 and 64 that are connected respectively to output terminals of the microprocessor 18, and these coils are pulsed respectively to close and open the relay contact 66 to switch on and off thermostat power to the associated second state cooling (or heating) thermostat wire blue/orange B/O or blue/white B/W. There can be other latching relays (or equivalent solid state switching elements) in the thermostat to control additional furnace/air-conditioning/heat pump functions. For example, fan-only green wire G may be present.

Also, the colors discussed here in connection with the thermostat wire run are only for sake of example. Different wiring conventions may employ different color coding for the various thermostat wires.

Figure 3:
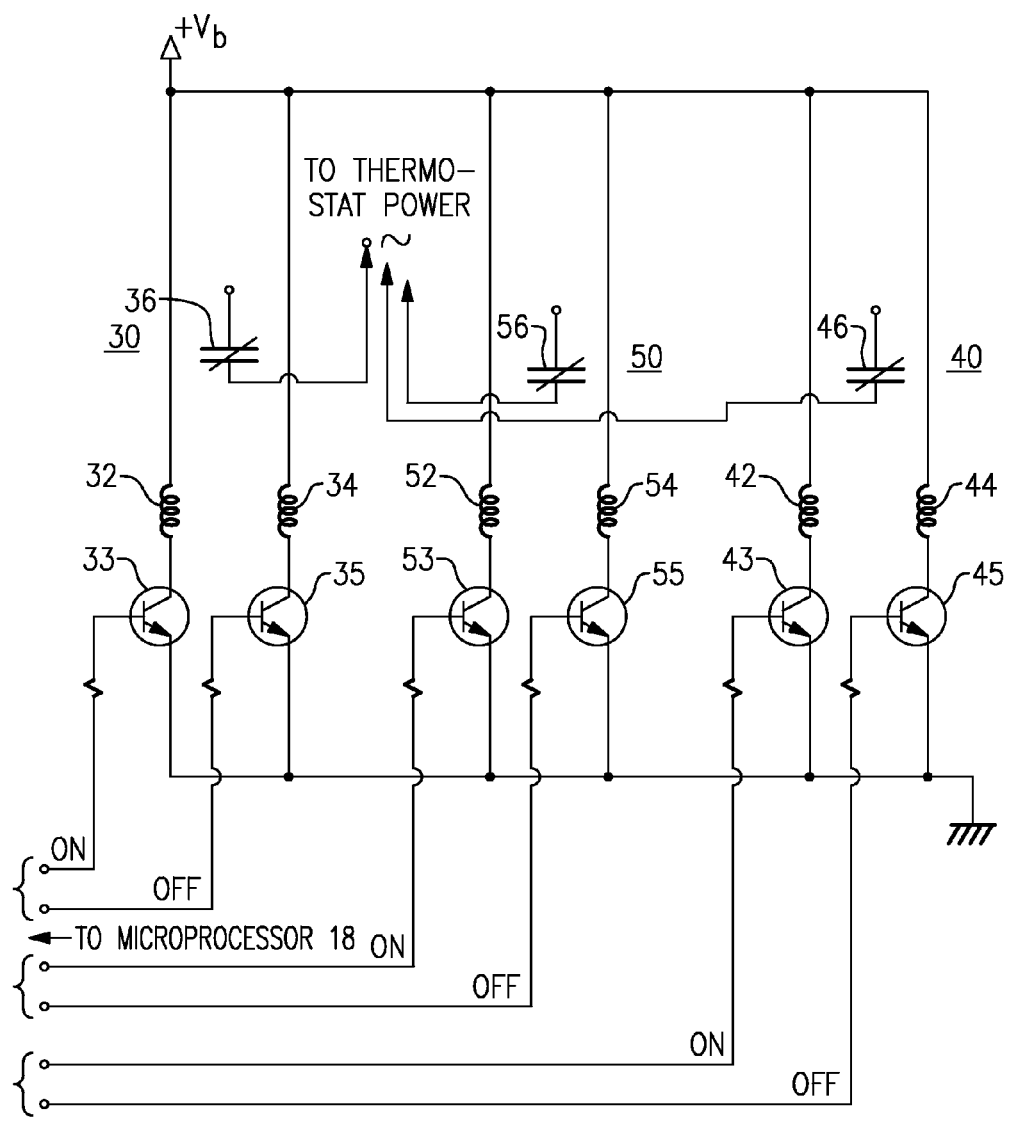
FIG. 3 is a schematic electrical diagram of the latching relay arrangement employed in this embodiment.

FIG. 3 is a general schematic of the latching relay arrangement that may be employed within this embodiment of the thermostat 10. Here three individual latching relays 30, 40, 50 are combined in a single package. Of course a different package could contain more latching relays, or an additional package of three could be installed in the thermostat to control additional functions, as needed. The latching relays could be implemented as solid-state switch devices. Each relay contact 36, 46, 56 is connected with its respective heat wire W, fan wire G or cooling wire Y. When one of the associated relay coils is pulsed, the latching contact is held in its open or closed state until latched the other way when the opposite relay coil is pulsed. For example if the microprocessor issues a call for heat, the microprocessor pulses the coil 32 with a DC pulse of approximately 20 milliseconds. In this embodiment, the pulse is supplied to the base electrode of a switching transistor 33 whose collector is connected with the coil 32. The transistor 33 issues a brief pulse of current into coil 32 which closes the contact 36, and the contact remains latched into the closed condition, supplying thermostat power on the W wire. The heating relay remains closed until the thermostat is satisfied and the microprocessor sends a pulse to the base of another transistor 35 whose collector is connected with the relay coil 34. A resulting current pulse through the coil 34 delatches the relay contact 36 and moves it to the OFF or open position. The contact remains latched open until there is another call for heat.

Solid state switch elements, in place of latching relays, would be controlled similarly.

In like fashion, the fan relay 40 has driver transistors 43 and 45 for its relay coils 42 and 44 for closing and opening the associated fan relay contact 46, and the air-conditioning latching relay 50 has driver transistors 53 and 55 for its relay coils 52 and 54 for closing and opening the air conditioning relay contact 56.

Additional latching relays may be included for second level heat, second level cooling, fan speed or other heating, cooling or air conditioning functions. Under a low battery condition, it is preferred that the second level heat and second level cooling functions be disabled to reduce the number of relay actuations.

Many different configurations and styles of latching relays are available, and this invention is not limited only to one or another type of latching relay.

In some cases, especially if battery voltage $V_b$ becomes low, a given relay contact may fail to latch when the associated relay coil is actuated. The thermostat microprocessor may detect that the room air temperature fails to satisfy the thermostat after a call for heating or after a call for cooling, and if that occurs, the microprocessor may re-pulse the associated relay coil, and in some cases may increase the pulse width, e.g., from 20 msec to 25 msec to ensure actuation. However, this will increase battery drain, and may be disabled under some or all low battery conditions.

Each relay actuation, i.e., each time that current is fed to the relay coils to switch the relay closed or open, there is an expenditure of electrical energy from the battery power source 20. Eventually, normal thermostat operations will drain the power from the power cells and cause the battery voltage $V_b$ to drop. Typically, battery life in a battery-powered thermostat is one year, or slightly over, and the occupant is advised to change the thermostat batteries annually. However, as often as not the occupant fails to change the thermostat batteries, and the available battery voltage will continue to drop until the thermostat can no longer function reliably.

Figure 4A:
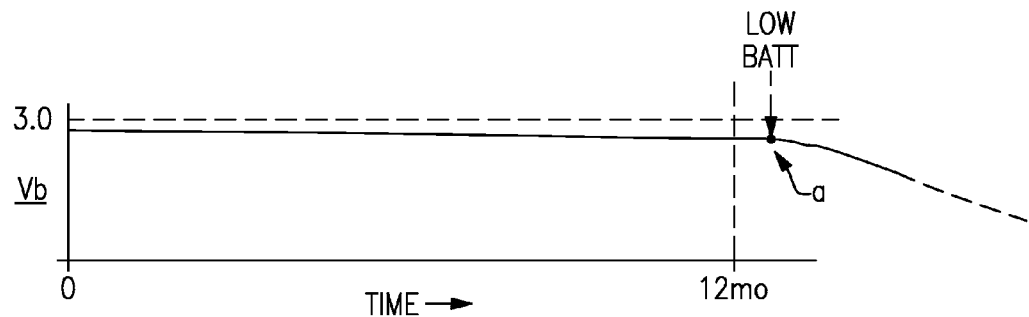
FIG. 4A is a chart showing the drop in voltage of the DC power source over the life of the battery in a conventional DC thermostat.

As shown in FIG. 4A, in normal thermostat operation, a fresh pair of power cells has a battery voltage level $V_b$ of a nominal 3.0 volts, but this level decreases over time. At about one year of operation, the battery voltage continues to drop and reaches a low-voltage threshold (shown at point a) e.g., 2.4 volts. At this point, the display panel 14 presents the LOW BATT alert message 22. This is intended to alert the occupant that the battery levels are low and that he or she should replace the existing power cells with fresh power cells. However, as long as the heating and cooling operations continue normally, there is nothing inducing the occupant to look at the thermostat and to check on the settings, so he or she may not notice the LOW BATT message for several weeks.

Figure 4B:
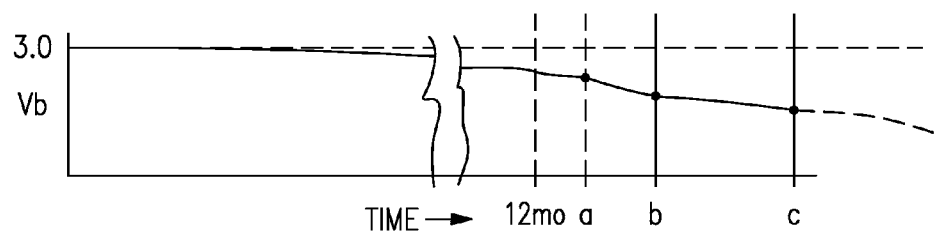
FIG. 4B is chart showing the drop in voltage of the DC power source over the life of the battery in a the DC thermostat of this invention.

In the thermostat arrangement of this invention, as the microprocessor continues to monitor the battery voltage $V_b$, when the battery voltage continues to decay down to a second, lower low-battery threshold, e.g. 2.2 volts, as shown at point b on FIG. 4B, the microprocessor 18 changes the temperature setpoints, e.g., changing the heat setpoint from 68° to 67° F., or changing the cooling setpoint from 74° to 75° F. This changes the cycle time for heating or cooling and reduces the number of heating cycles per day, which thus reduces the number of times that the relay coils need to be pulsed. This would change the temperature swing between initiation and satisfaction from e.g. 2° to 3° At the same time, when the voltage is below the second low-battery threshold, the microprocessor will no longer actuate any of the additional functions, such as second level heat, second level cooling, fan speed, etc., and none of the additional relays associated with those additional functions are actuated, which reduces the drain on the remaining battery life. Thus the battery voltage decays at a slower rate, as indicated between points b and c in FIG. 4B.

If the battery voltage $V_b$ continues to decay to a third low-battery voltage threshold, e.g., as indicated at point c, for example 2.1 volts, the microprocessor can change the temperature setpoints by an additional amount, e.g., from 67° to 65° F. for heating and from 75° to 77° for cooling. This in effect increases the temperature swing to 5°. This will again reduce the rate at which battery power is used for pulsing the relay coils, and will somewhat further extend the battery life.

In addition, the change in heating or cooling cycles is usually noticeable to the occupant when present in the dwelling or other comfort zone, and this will induce him or her to check the thermostat settings. When that occurs, the occupant will have reason to notice the LOW BATT alert message 22, and will be prompted to change the power cells for fresh power cells. When that occurs, the normal battery voltage $V_b$ level from the fresh cells will immediately return the thermostat to the normal operations, and return the temperature setpoints to their level before the low battery condition.

As an alternative to changing the temperature setpoints when the battery voltage $V_b$ falls below the low-voltage threshold, the thermostat microprocessor 18 may instead alter the swing amount, i.e., the temperature difference between a call for heating (or cooling) and thermostat satisfaction. This may involve changing the swing amount from the usual 1° to perhaps 2° or 3°.

The change in setpoint or temperature swing will usually be noticeable and may provide below optimum comfort conditions within the comfort zone, but will prolong thermostat operations significantly at the end of battery life, and may avoid damage such as freezing water pipes, or temperature stress to household plants and pets.

While the invention has been described with reference to specific preferred embodiments, the invention is certainly not limited to the precise embodiments as described and illustrated here. Rather, many modifications and variations will become apparent to persons of skill in the art without departure from the scope and spirit of this invention, as defined in the appended claims.

We claim:

1. Battery-powered wall thermostat adapted to be mounted on a wall of a comfort space and coupled by a set of thermostat wires to a comfort air apparatus that provides heated or cooled air to said comfort space when the temperature of air in said comfort space reaches a temperature setpoint selected by an occupant of said comfort space; and comprising
    a housing adapted to be mounted on the wall of said comfort space;
    a temperature sensing element in or on said housing;
    a selector mechanism configured to permit the occupant to adjust said temperature setpoint;
    a DC power source within said housing comprised of one or more power cells providing battery power at a battery voltage $V_b$;
    a display on said housing that is configured so as to show the temperature within the comfort space and the temperature setpoint, and including a feature for providing a low-battery alert message;
    a microprocessor within said housing adapted to control actuation of said comfort air apparatus when the comfort space temperature reaches a temperature based on said temperature setpoint and to control deactuation of said comfort air apparatus when the comfort air temperature changes from said temperature setpoint by a predetermined swing amount;
    said microprocessor including
        power terminals connected with said DC power source;
        one or more input terminals connected with said temperature sensing element;
        one or more output terminals connected with said display; and
        at least a first pair of output terminal ports;
    at least one latching relay having ON and OFF inputs connected respectively to respective output ports of said at least one pair of output terminal ports of the microprocessor, said latching relay having a contact mechanism to connect thermostat power to one wire of said set of thermostat wires in response to a pulse from one output terminal port of said pair of output terminal ports and to disconnect thermostat power from said one wire in response to a pulse from the other output terminal port of said at least one pair of output terminal ports;
    said microprocessor further including a battery voltage monitoring functionality to compare the battery voltage $V_b$ of said DC power source with one or more predetermined low-battery voltage threshold levels to actuate the low-battery alert message on said display when said battery voltage $V_b$ drops to or below one of said one or more voltage thresholds;
    said microprocessor further including a temperature setpoint altering functionality operative when the battery voltage $V_b$ drops to or below one of said one or more voltage thresholds to change one of said setpoint selected by the occupant or said swing amount, thereby increasing the cycle time between actuation and deactuation of said comfort air apparatus and thereby prolonging the remaining service life of said DC power source.

2. Battery-powered wall thermostat according to claim 1, wherein said battery voltage $V_b$ has an initial nominal voltage, the one or more voltage threshold at which the microprocessor actuates said low battery alert message is a first level below said nominal voltage, and the one or more low-voltage threshold at which the microprocessor alters the setpoint or swing amount is a second level below said first level.

3. Battery-powered wall thermostat according to claim 2, wherein at the threshold at the second voltage level, the microprocessor changes the temperature setpoint by a predetermined amount.

4. Battery-powered wall thermostat according to claim 3, wherein at a third low-voltage threshold level below said second low-voltage threshold level, the microprocessor changes the temperature setpoint by a predetermined additional amount.

5. Battery-powered wall thermostat according to claim 1, wherein the thermostat comprises one or more additional latching relays each having a contact mechanism to connect thermostat power to a respective wire of said set of thermostat wires in response to a pulse from one output terminal port of an additional pair of output terminal ports of said microprocessor and to disconnect thermostat power from said one wire in response to a pulse from the other output terminal port of said additional pair of output terminal ports, and wherein said temperature setpoint altering functionality of said microprocessor is operative, when the battery voltage $V_b$ drops to or below one of said one or more voltage thresholds, to disable pulsing from said one output terminal port of said additional pair of output terminal ports, so as to minimize additional battery drain on said DC power supply during a low-voltage condition.

6. Battery-powered wall thermostat adapted to be mounted on a wall of a comfort space and coupled by a set of thermostat wires to a comfort air apparatus that provides heated air to said comfort space when the temperature of air in said comfort space drops to a heat temperature setpoint selected by an occupant of said comfort space and provides cooled air to said comfort space when the temperature of air in said comfort space rises to a cooling temperature setpoint selected by the occupant of said comfort space; and comprising
    a housing adapted to be mounted on the wall of said comfort space;
    a temperature sensing element in or on said housing;
    a selector mechanism configured to permit the occupant to adjust said temperature setpoints;
    a DC power source within said housing comprised of one or more power cells providing battery power at a battery voltage $V_b$;
    a display on said housing that is configured so as to show the temperature within the comfort space and the temperature setpoints, and including a feature for providing a low-battery alert message;
    a microprocessor within said housing adapted to control actuation of said comfort air apparatus when the comfort space temperature reaches a temperature based on one of said temperature setpoints and to control deactuation of said comfort air apparatus when the comfort air temperature changes from said temperature setpoint by a predetermined swing amount;

said microprocessor including
- power terminals connected with said DC power source;
- one or more input terminals connected with said temperature sensing element;
- one or more output terminals connected with said display; and
- a plurality of pairs of output terminal ports;

a plurality latching relays each having ON and OFF inputs connected respectively to the output ports of a respective one of said plurality of pairs of output terminal ports of the microprocessor, each said latching relay having a latching contact mechanism to connect thermostat power to one wire of said set of thermostat wires in response to a pulse from one output terminal port of said pair of output terminal ports and to disconnect thermostat power from said one wire in response to a pulse from the other output terminal port of said at least one pair of output terminal ports, with a first one of said latching relays being connected with the one of the thermostat wires that calls the comfort apparatus to provide heat to the comfort space, and with a second one of said latching relays being connected with the one of the thermostat wires that calls the comfort apparatus to provide cooled air to said comfort space; and with additional ones of said latching relays being connected with the ones of the thermostat wires that call for the comfort apparatus to carry out additional respective functions;

said microprocessor further including a battery voltage monitoring functionality to compare the battery voltage $V_b$ of said DC power source with one or more predetermined low-battery voltage threshold levels to actuate the low-battery alert message on said display when said battery voltage $V_b$ drops to or below one of said one or more low-battery voltage threshold levels;

said microprocessor further including a temperature setpoint altering functionality operative when the battery voltage $V_b$ drops to or below one of said one or more low-battery voltage threshold levels to change at least one of said setpoints selected by the occupant or said swing amount, thereby increasing the cycle time between actuation and deactuation of said comfort air apparatus and thereby prolonging the remaining service life of said DC power source; and when said battery voltage $V_b$ drops to or below said one or more low-battery voltage threshold levels, disabling the pairs outputs terminal ports of said microprocessor that are associated with said additional latching relays to prevent energizing of such latching relays during a low-voltage condition of said DC power source.

7. Battery-powered wall thermostat according to claim 6, wherein said battery voltage $V_b$ has an initial nominal voltage, the one or more voltage threshold at which the microprocessor actuates said low-battery alert message is a first level below said nominal voltage, and the one or more low-voltage threshold level at which the microprocessor alters the setpoints or swing amount is a second level below said first level.

8. Battery-powered wall thermostat according to claim 7, wherein at the threshold level at the second voltage level, the microprocessor changes the temperature setpoint by a predetermined amount.

9. Battery-powered wall thermostat according to claim 8, wherein at a third low-voltage threshold level below said second low-voltage threshold level, the microprocessor changes the temperature setpoint by a predetermined additional amount.

* * * * *